MASER

Filed Dec. 24, 1957

INVENTOR.
LOWELL E. NORTON
BY J. L. Whittaker
ATTORNEY

June 5, 1962 L. E. NORTON 3,038,124

MASER

Filed Dec. 24, 1957 2 Sheets-Sheet 2

INVENTOR.
LOWELL E. NORTON
BY J. C. Whittaker
ATTORNEY 3,038,124
Patented June 5, 1962

3,038,124

MASER

Lowell E. Norton, Princeton, N.J., assignor to Radio Corporation of America, a corporation of Delaware Filed Dec. 24, 1957, Ser. No. 705,062
16 Claims. (Cl. 330—4)

The present invention relates to new and improved atomic and molecular amplifiers, generators and the like, and to new and improved components for such apparatus.

An object of the present invention is to provide new and improved types of atomic and molecular amplifiers, generators and the like.

Another object is to provide atomic and molecular amplifiers and generators operating on a new principle.

Another object is to provide atomic and molecular amplifiers, generators and the like which have greatly increased power output.

Another object is to provide atomic and molecular amplifiers, generators and the like using new types of synthetic solid substances.

The ferroelectric effect, as presently understood, arises from strong correlations between the orientations of closely spaced electric dipoles of various substances. Ordinary circuits using ferroelectric materials, such as piezoelectric oscillators, for example, or capacitors with ferroelectric dielectrics, depend only on the "bulk orientation" or "concert" behavior of the electric dipoles under the influence of a driving electric field.

This theory cannot explain the behavior of ferroelectric substances under certain conditions. For example, there are certain dielectric substances which, when heated to a value above a "critical" temperature, change from being ferroelectric to antiferroelectric. "Antiferroelectric" is defined as the situation in which alternate "strings" of dipoles are oriented in opposite direction. The critical temperature may be a Curie temperature. A Curie temperature has previously been defined as the temperature at which the dielectric constant and spontaneous polarization of a ferroelectric material suddenly change. It is preferred here to define the Curie temperature as the temperature below which the internal dipolar energy exceeds thermal energy and hence has the larger and determining effect on dipole orientation. The "bulk orientation" theory cannot explain, for example, the dipole characteristics above the Curie temperature.

The behavior of dielectric materials under the conditions above can be explained in the following manner which has not been suggested previously. It is believed that the discrete dipoles in a ferroelectric material can assume one of a plurality of discrete orientations. Each dipole orientation corresponds to a discrete energy level. The number of orientations which can be assumed by the dipoles depends upon the structure of the ferroelectric material. As a typical example, in a common ferroelectric material such as barium titanate, the cell structure is cubic in nature; there are barium atoms at the lattice corners, oxygen atoms at the face centers, and a titanium atom at the center of the cubic structure. It is believed that, in this case, the center titanium atom may be capable of assuming one of a plurality of different displaced-from-center positions, corresponding to different energy levels which may, however, be degenerate.

Above the Curie temperature, the probability that a given dipole will assume one of at least two discrete, "coupled," orientations is defined by the Boltzmann distribution.

$$\frac{N_1}{N_2}=e\ (\text{exp.})\ \frac{-\Delta E_0}{kT}\ ,$$

where $N_1$=number of dipoles in an orientation corresponding to a higher energy state,
$N_2$=number of dipoles in an orientation corresponding to a lower energy state,
$\Delta E_0=h\nu$=energy separation,
$h$=Planck's constant,
$\nu$=frequency of transition,
$T$=temperature in ° K., and
$k$=Boltzmann constant.

Under conditions of thermal equilibrium, $N_2$ is greater than $N_1$ and T, the internal temperature, is positive. Above the Curie temperature, it is believed that there is a superposition of all the allowed and discrete quantum dipole orientations. Transitions between these orientation states may be utilized directly if the energy separations lead to frequencies in the desired region of the spectrum. Additionally, in the case of specific materials where a "two potential wells separated by a not-too-high potential hill" point of view is appropriate, the single discrete energy states will split into at least doubled states. Transitions between these split states may be utilized to operate in a different (generally much lower) region of the frequency spectrum.

At temperatures below the Curie temperature, the orientation state distribution is not in accordance with the equation above. The interaction between dipoles is so strong that it has a greater effect on dipole orientation than the thermal kinetic energy of the dipoles. The possibility of dipole orientations in other than the bulk orientation direction at these temperatures is believed to be close to zero.

According to one mode of operation of the present invention, the temperature of the dielectric material is raised to a value greater than the Curie point. An electric field is then applied. In one form of the invention, the electric field may be an intense, direct electric field. Under these conditions, the dipoles assume orientations such that the system energy is a minimum. In other words, the populations in the various dipole orientation states can be defined by a Boltzmann distribution. The populations in two "coupled" dipole orientations, that is, two orientations which, according to the "selection rules," can cause an emission or absorption of energy when the population shifts from one to another, can be defined by the Boltzmann equation given above. If now the electric field through the material is suddenly reversed, as, for example, either by changing the direction of the applied field or by changing the position of the dielectric substance, the internal temperature T of the two coupled dipole orientation states of the system will be changed to a negative value, whereby the system becomes unstable and is in condition to emit energy during its return to a stable condition.

In another form of the invention, the temperature of the material acted on in the manner described above is maintained below the Curie temperature. When the material is immersed in an electric field, all or almost all dipoles assume the bulk orientation direction. Upon reversal of the electric field, the internal temperature of the substance is made negative, that is, the material is in condition to emit energy. An advantage of operating below the Curie temperature is that a greater number of dipoles are originally in a given orientation state and this means that a greater number are excited, that is, placed in condition to emit energy, upon reversal of the exciting electric field. The emission intensity (power output) depends upon the square of the number of excited (high energy state orientation) dipoles.

Other methods are possible for changing the internal temperature of a ferroelectric substance to a negative value and these will be described in greater detail later.

A limiting factor in the operation of the systems described above is the relaxation time of the dipoles. The relaxation time is defined as the time required for a dipole which has been placed in an unstable (higher energy state) orientation to return to its stable orientation. The relaxation time should be relatively long so as to permit the extraction of a useful and coherent frequency output from the system.

It is convenient to consider two aspects of the relaxation process, each with its own time. They are: (1) a relaxation time related to the time of thermal interaction with the lattice, and (2) a dipole-dipole interaction time which may be considered as a dipole spin orientation flipping due to dipole fields of near neighbors. In general, for any specific material, dipole-lattice relaxation times can be increased by reducing the temperature, and dipole-dipole interaction times can be increased by increasing the distance to near neighbors.

In many ferroelectric materials, long relaxation times may be difficult to achieve as the individual dipoles are so closely spaced to one another that there is sufficient dipole-dipole interaction very quickly to return them to their equilibrium positions. One way this difficulty may be overcome is to dilute the ferroelectric material. Another and greatly improved way, according to this invention, is to imprison the selected electric dipole material in recurrent cells or cages which effectively isolate the dipoles from one another, that is, which prevent their interaction and thereby substantially increase their relaxation times.

In the new and important synthetic "ferroelectric/paraelectric" material described above, the dipole-dipole interaction is easily controllable by fixing the spacing of near neighbors; that is, by filling an appropriate fraction of the total number of available cells. Additionally, by choosing materials which exhibit little or no rearranging of bonds when interstitials are added, collisions between active dipole particles and the host cell are relatively ineffective in influencing the internal states of the active particles. Hence, the relaxation times are relatively long.

As an example of a material as described above, ammonia may be imprisoned in a so-called "clathrate" compound. In compounds of this type, one molecular compound, such as a closed ring, crystalline, organic compound, forms an enclosing structure trapping the second compound for which it need not have any preferably should not have any attraction, from a chemical point of view. In another form of the invention, the substance with dipoles may be imprisoned in the cells of a molecular sieve. Other solutions include the use of chelation and cross linked plastics.

The invention will be described in greater detail by reference to the following description taken in connection with the accompanying drawing in which.

Similar reference characters are applied to similar elements throughout the drawings.

Figure 1:
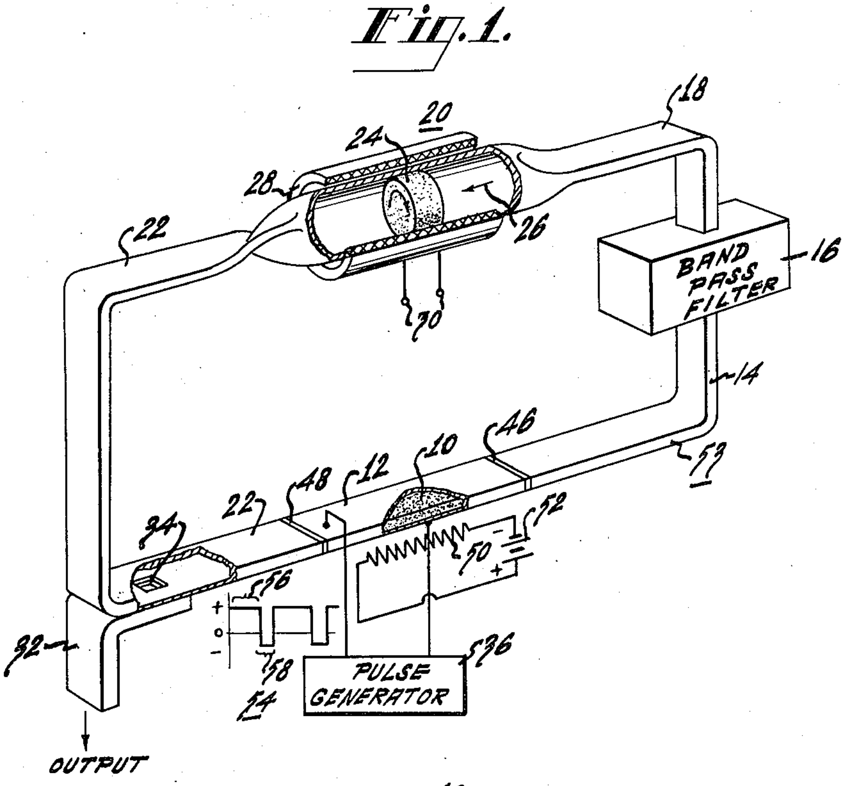
FIG. 1 is a partially schematic, perspective view of one embodiment of the invention.

Referring to FIG. 1, which illustrates a form of the invention useful as an oscillator, a solid ferroelectric material 10 is located within a section of rectangular waveguide 12. Preferably, the inner walls of the waveguide are silver plated to lessen losses. Preferably also, the waveguide dimensions are such that the impedance of waveguide section 12 is equal or close to that of the remainder of the waveguide system to be described below.

A feedback loop is connected to waveguide section 12 which includes waveguide 14, band pass filter 16, waveguide 18, waveguide section 20, and waveguide 22. The ends of waveguide section 12 are coupled to the feedback loop by conventional choke joints between which are insulating material. The purpose of the choke joints is to provide smooth electrical continuity between the various waveguides of the system and the purpose of the dielectric material between the waveguide sections is to electrically insulate waveguide 12, with respect to D.C. from the remainder of the waveguide system.

Waveguide section 20 contains a 45° Faraday rotator 24. This is a device which permits energy to propagate in the direction of arrow 26 only. It requires for its operation a magnetic field and this is applied by coil 28. A source of direct current, not shown, may be connected to terminals 30. The principle of operation of the gyrator is explained in detail in Patent No. 2,802,944, issued August 13, 1957, to the present applicant.

Output energy is taken from the system by means of waveguide 32. The latter is coupled to waveguide 22 at aperture 34. The latter is a directional coupler and is shown schematically as being of the single slot type.

Pulse generator 36 is electrically connected to waveguide section 12. Its function is to apply time repetitive pulses of alternately opposite polarity to the ferroelectric material 10 as will be explained more fully below.

Figure 2:
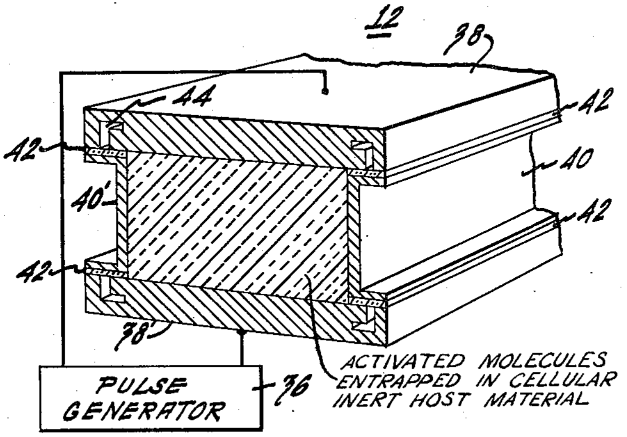
FIG. 2 is a cross-sectional perspective view of a portion of the embodiment of FIG. 1.

The structure of waveguide 12 is shown in greater detail in FIG. 2. The waveguide is of rectangular cross-section and includes a pair of broad walls 38, 38' and a pair of narrow walls 40, 40'. The broad and narrow walls are insulated from one another by means of dielectric spacers 42. However, in order to provide A.C. continuity between the broad and narrow walls, choke joints 44 are provided. These operate in the conventional manner in that looking from the inside of the waveguide toward the dielectric material, the short circuited slot 44 appears at the inner waveguide wall as a short circuit. This, of course, is accomplished by making the slot of the proper length, as, for example, one-half wavelength from the inside of the waveguide into the dielectric material and through the slot to the closed end thereof. Pulse generator 36 is shown connected to the broad walls 38, 38'. It will be remembered that these broad walls are insulated from the broad walls of the adjacent waveguides 14 and 22 (FIG. 1) by dielectric means in the choke joints. The latter are shown schematically at 46 and 48 in FIG. 1.

Returning to FIG. 1, in some forms of the invention, it is advantageous to heat the ferroelectric material to a temperature equal to or greater than the Curie point and in other forms of the invention, it may be desirable to cool the ferroelectric material. The heating means may take any one of many forms but is shown schematically in FIG. 1 by the resistance wire 50 and the D.C. source 52. The wire, as a matter of fact, may be imbedded in one or more waveguide walls, if desired. The cooling means is not shown but may consist of cooling coils surrounding waveguide 12 or a low temperature liquid in which waveguide 12 is immersed.

In operation (above a Curie point), for a conventional type of ferroelectric material such as barium titanate, for example, a sufficient amount of heat is applied by heater element 50 to raise the temperature of the material to a value equal to or greater than a Curie point. At the same time, pulse generator 36 applies a wave, as shown at 54, to the opposite broad walls 38, 38' (FIG. 2) of waveguide 12. During the portion 56 of the applied pulse and while the dielectric material is being heated, the dipoles in the dielectric material assume orientations in accordance with the Boltzmann distribution equation previously discussed. In other words, they assume orientations such that the system energy is at its lowest value consistent with the applied electric field and ambient temperature. During the period 58, the polarity of the applied pulse is quickly reversed. When this is done, the populations $N_j$ and $N_2$ are suddenly reversed and this means, in effect, that T changes from a positive to a negative value. The dipoles are thereby placed in an unstable condition. If the relaxation time of the ferroelectric material is sufficiently long, the ferroelectric material is capable of emitting energy during the period 58. The frequency at which energy is emitted for a particular pair of coupled dipole orientations is given by the usual equation $$\omega_0=\frac{\Delta W}{\hbar}$$

where $\hbar$ is Planck's constant divided by $2\pi$ and $\Delta W$=the difference in energy between the two dipole orientation states under consideration.

If it is desired to extract energy from the system at frequency $\omega_0$, band pass filter 16 is tuned to this frequency. It is assumed that there is sufficient thermal noise present in the system at frequency $\omega_0$ to induce transitions in the ferroelectric material 10 such that it begins to emit at frequency $\omega_0$. This energy passes through waveguide 14 and band pass filter 16 to waveguide 18. From waveguide 18 it passes through the gyrator 24 and back through waveguide 22 to the waveguide 12 containing the ferroelectric material. The lengths of the various waveguides are such that the energy arrives back at the ferroelectric material in phase with the energy being emitted so that the system acts as an oscillator. A portion of this energy may be taken as an output at waveguide 32. It is coupled to waveguide 32 through coupling aperture 34.

In the discussion above, only a single frequency is mentioned. It will be appreciated, however, that the ferroelectric material is capable of emitting energy at a plurality of frequencies. Each frequency corresponds to the transition between two dipole orientation states.

The above discussion has been rather brief since the mode of operation of the system is quite analogous to that of the system covered by the patent noted above. However, in the present system, the emission of energy depends upon transitions of electric dipoles between various orientation states existing in solid ferroelectric and ferroelectric like materials. This is the first time that this phenomenon has been suggested and the first time it has been proposed for use in an atomic or molecular generator. An important advantage of the use of solid electric dipole moment material and dipole state orientations in molecular generation over the use of molecularly resonant gases is that there are many more dipoles present per unit volume of ferroelectric material than there are molecules present in a like volume of an excited gas. The raio may be as high as $10^7$ and since the amount of energy which can be generated is a function of the square of the number of particles (electric dipoles in the present case) which can be excited, this is extremely important.

The present arrangement also has important advantages over previous solid state molecular amplifier systems. In the latter, the excitable solids are paramagnetic; that is, they are assemblages of magnetic dipoles. The collision processes are of a different type than what is described here and have a different effect on active particle internal energy states. The materials described in this patent application utilize electric dipole interactions which are greater than magnetic dipole interactions by the ratio of electric to magnetic dipole moments; i.e., somewhat greater than two orders of magnitude. On a per unit basis, emission intensities depend on the square of dipole moments; hence the emissions of the above material are greater by a factor of about $10^4$.

The system of FIG. 1 may, with minor modification, be used as an amplifier. First, a small amount of attenuation is added in the feedback loop in order to reduce the loop gain to slightly less than unity. Band pass filter 16 may be eliminated. An input waveguide is coupled to the feedback loop via a directional coupler at point 53. This carries the energy to be amplified-energy at a frequency characteristic of a dipole orientation state transition.

Figure 3:
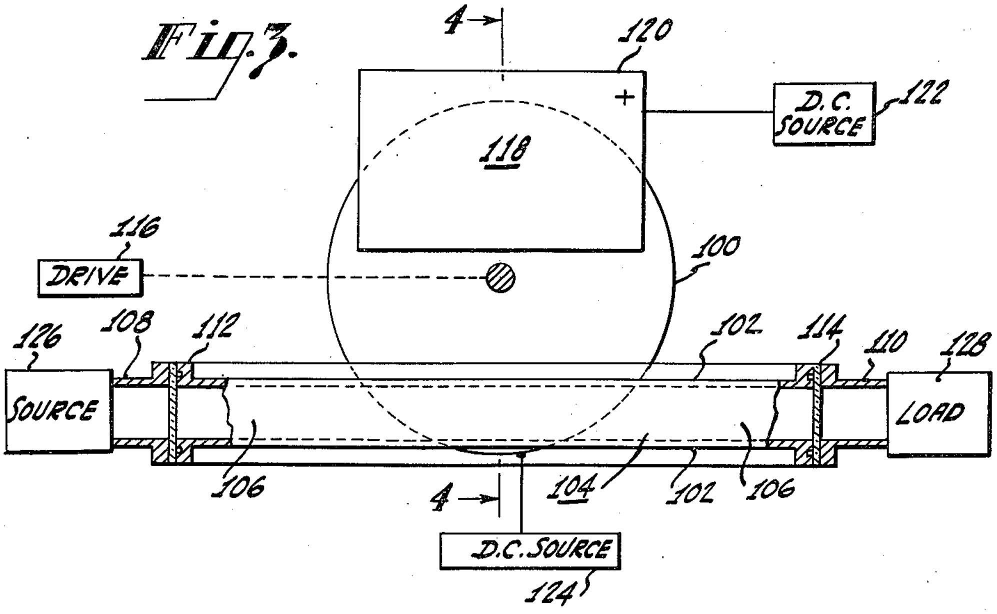
FIG. 3 is a schematic view of another form of the invention.
Figure 4:
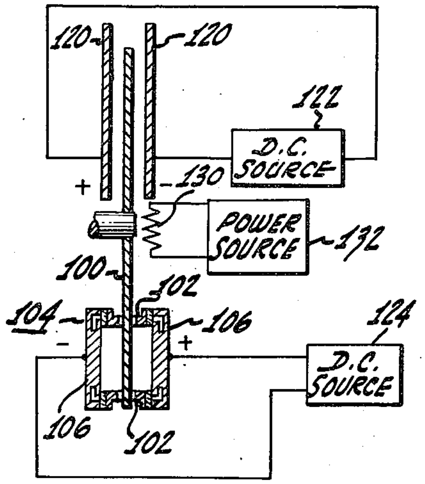
FIG. 4 is a cross-section along line 4—4 of FIG. 3.

FIGS. 3 and 4 illustrate another system employing the present invention which is useful as an amplifier. A disk of ferroelectric material 100 extends through the narrow walls 102 of a rectangular waveguide 104 similar to the waveguide shown in FIG. 2. Again the broad walls 106 are insulated from the narrow walls 102. The broad walls 106 are also insulated from the broad walls of the adjacent waveguides 108 and 110. Again choke joints with insulation between the joints may be used. These are shown schematically at 112 and 114.

Disk 100 is continuously driven by a drive means 116 which may be an electric motor or the like. A portion of the disk 118 passes between a pair of plates 120 which are charged to a direct voltage by source 122. The broad walls 106 of the waveguide are also charged to a high voltage, however, in a sense opposite to that of plates 120. Again a D.C. source 124 is shown connected across the broad walls.

A source 126 supplies electromagnetic wave energy to the system and a utilization circuit shown as load 128 is connected to the opposite end of the waveguide system. It is understood that the frequency supplied by source 126 is one which is characteristic of a dipole state orientation transition of the material of which disk 100 is formed.

In operation, disk 100 is continuously rotated by drive means 116. The pair of plates 120 cause the dipoles to assume discrete orientations in accordance with the field strength produced between the plates and the ambient temperature. For some materials, it may be desirable to raise the temperature above the Curie point. A heating means for this purpose consisting of a heating element 130 and power source 132 is shown schematically in FIG. 4. For some materials, it may be desirable to lower the temperature and cooling means such as previously described may be used. These are not shown in FIGS. 3 or 4.

The D.C. electric field applied to the ferroelectric disk when it enters the waveguide is opposite that of the field produced by plates 120. In this manner, the population distribution, that is, the dipole orientation state populations are suddenly reversed. The ferroelectric substance is now therefore in a condition to emit energy, provided the relaxation times are sufficiently long. Energy is supplied by source 126 at a frequency characteristic of a given transition and this energy is amplified in section 104 of the waveguide containing the disk in the manner already explained previously.

It is to be understood that with minor modification, the system of FIGS. 3 and 4 may be used as an oscillator. All that is necessary is to convert waveguide section 104 into a cavity resonator so that there is a sufficient amount of regeneration to sustain oscillations.

Many other arrangements may be used with ferroelectric substances to produce amplification, generation or absorption phenomena. For example, the arrangements shown in FIGS. 8–22 of application Serial No. 607,949, filed September 4, 1956, by the present applicant may also be used with minor modification. The modifications consist of substituting for the solid substances of which the disk or tape are formed, ferroelectric materials of the type to be described in greater detail below. Also, instead of using a magnetic field for exciting the substances, as is used in a number of the embodiments of the above said application, an electric field should be used instead. Moreover, it is preferable to insert the disk, ring, tape or the length of dielectric material through the short rather than the long wall of the waveguide. The electric field may be applied to the waveguide in a manner similar to that shown in the figures of the present application. In other words, the waveguide may be formed with the four walls insulated from one another and the D.C. voltage may be applied to the opposite broad walls. Also, instead of using D.C. fields, a radio frequency field may be used as described in connection with the embodiment of FIG. 20 of the application mentioned above.

It has been previously mentioned that in systems of the type described above, it is desirable that the ferroelectric material have a relatively long relaxation time. It is also desirable, of course, that the unit active particle density of the ferroelectric material be relatively large in order to obtain a relatively large amount of power from the system. A preferred way of achieving both objectives above is to imprison a suitable active material (one with dipoles capable of assuming different orientation states) in a "clathrate" compound. A clathrate compound is one in which one molecular compound forms an enclosing structure trapping a second compound for which it need not have and preferably does not have any attraction from a chemical point of view. Because there is little or no chemical bonding involved between the clathrate cage molecules and their trapped active molecules, the interaction between the two is small; because each active particle is imprisoned by a clathrate cage, the "active particle-active particle" interaction is also controlled and limited.

In some cases of the materials described above, the "imprisonment ratio" should be made one active particle per unit regular, recurrent clathrate cage. In other cases, the imprisonment ratio may be made less than one active particle per unit regular, recurrent clathrate cage in order to obtain smaller mutual particle interaction.

The active particles referred to above may be, for example, molecules of a type in which the ion or ions responsible for the dipole moment have several (quantum mechanically) allowed equilibrium positions. As a typical example, the particles may be ammonia molecules which, because of their particular structure, have only two allowed equilibrium positions of the particle constituent responsible for the dipole moment. The cage portions of the clathrate compound can be of the general chemical class characterized as having ring structures; solid benzine is typical. The cage should have a suitably large enclosed volume so that it can accommodate and imprison the "captive" particle. In addition, the clathrate cage material must have an electrical conductivity sufficiently low that interior cells are not screened or shielded from electromagnetic or electric fields. Because of the last requirement, it is desirable, in some instances, not to use normal ring structure clathrates but instead large molecules as in many types of plastics which can be crystallized as, for example, by slow cooling.

A typical clathrate compound which is useful in the systems described above may be made in the following manner: A solid, crystalline, benzine ring type host crystalline substance is heated at reduced pressure to a temperature lower than that which destroys the crystalline structure. Active dipole moment molecules, ammonia for example, are then admitted under a pressure which, typically, is in the range 3–10 atmospheres. The number of dipole moment molecules imprisoned will depend upon such factors as the pressure and the time during which the crystalline host structure is exposed to the dipole moment molecules.

Another type of material which is suitable for use in systems of the type described herein in which there is little or no chemical bonding between the active and inactive portions of the compound consists of suitable active particles imprisoned in "molecular sieves," either with suitable sealing films on the sieves, or not, as required, to prevent the escape of active particles from the sieve. Again, using ammonia as an active particle, suitable molecular sieves are described in a catalog published by Linde Company on September 10, 1957, titled "Molecular Sieves," Form 9690B. In particular, type 4A and 5A molecular sieves are suitable for the imprisonment of ammonia molecules. One typical manufacturing process is as follows: The sieve is placed in a container and the pressure within the container reduced to perhaps 1 millimeter of mercury. (The precise pressure is not critical.) The temperature of the sieve is then slowly raised to a value less than that required to destroy the cage or crystalline structure of the sieve. The dipole moment substance is then admitted to the container under pressure of say 3 to 10 atmospheres. The sieve is then allowed to cool.

Other forms of chemical substances, having dipole moments, which may be imprisoned in a molecular sieve for use in the present invention include the following:

*Linear Molecules*

HCN
OCS
HCCN
ClCN

*Symmetric Top Molecules*

$NH_3$
$PF_3$
$PH_3$
$AsF_3$
$POF_3$
$GeH_3Cl$
Trioxane
$CH_3CN$
$CH_3NC$
$CF_3CCH$
$B_5Hg$ As previously noted, still another material of the host cage-active molecule type uses a cross linked plastic as a host cage; Lucite and polystyrene are two illustrations. The manufacturing process is similar to that already given for the sieve and clathrate compounds.

What is claimed is:

1. In combination, a material consisting of a first dielectric substance having recurrent cells and a second substance having dipoles which are capable of assuming a plurality of discrete orientations, transition of said dipoles from one to another of said orientations resulting in emission of energy at a characteristic frequency, said second substance having substantially no chemical affinity toward the first substance, each molecule of the second substance being imprisoned physically within a cell of the first, the dipole orientation distribution of said second substance being defined by a positive internal temperature; and means coupled to said first substance for exciting at least one energy level transition in said second substance for changing the sign of said internal temperature to a negative value.

2. In the combination as set forth in claim 1, said first substance comprising a molecular sieve.

3. In the combination as set forth in claim 1, said first substance comprising a clathrate.

4. In the combination as set forth in claim 1, said second substance comprising ammonia.

5. In combination, a solid state material comprising a dielectric substance having recurrent cells, a second substance individual particles of which are located in at least some of the cells but which substantially do not chemically react with the first- mentioned substance, said particles being capable of energy level transitions for energy emission at at least one characteristic frequency; and means coupled to said material for exciting said particles to produce said energy level transitions and said energy emission.

6. In combination, a solid state material comprising a first dielectric substance having recurrent cells and a second substance having dipoles and which has substantially no chemical affinity toward the first substance, said substance being capable of energy level transitions for energy emission at at least one characteristic frequency, each molecule of the second substance being imprisoned physically within a cell of the first; and means coupled to said material for exciting the dipoles of said second substance, to produce said energy level transitions and said energy emission.

7. In the combination as set forth in claim 6, the number of molecules of the second substance being substantially less than the number of cells in the first substance.

8. In combination, a molecular sieve; a substance capable of energy level transitions for energy emission at at least one characteristic frequency molecules of which are physically imprisoned within the cells of the sieve; and means coupled to said sieve for exciting said energy level transitions to change the sign of the internal temperature of said substance.

9. In combination, a molecular sieve; a substance having substantially no chemical affinity for said sieve and which is capable of energy level transitions in response to radiation stimulation for energy emission at at least one characteristic frequency, each molecule of said substance being physically imprisoned in a different cell of said sieve; and means applying radiation to said sieve for exciting said transitions to change the sign of the internal temperature of said substance.

10. A substantially solid state material comprising a first solid substance having recurrent cells therein, and a second substance having substantially no chemical affinity for said first substance, each molecule of said second substance being imprisoned physically within a different cell of said first substance, said second substance being capable of energy level transitions which produce electromagnetic emission at at least one characteristic frequency in response to irradiation; and means for irradiating said material for exciting said energy level transitions to change the sign of the internal temperature of said substance.

11. The invention as claimed in claim 10 in which said material is initially at a temperature lower than the Curie temperature providing an environment such that the dipoles of said second substance are substantially all in the same orientation.

12. The invention as claimed in claim 10 in which said material is initially in an environment such that the average kinetic energy of the dipoles of said second substance is greater than their average dipole-dipole fields.

13. The invention as set forth in claim 10 in which the solid is a natural ferroelectric material.

14. The invention as set forth in claim 10 in which said solid substance is a clathrate compound consisting of a host dielectric substance having a ring-like structure, and said second substance has electric dipole moments.

15. The invention as set forth in claim 10 in which the solid is a molecular sieve in at least some of the cells of which are imprisoned molecules of an electric dipole moment substance.

16. The invention as set forth in claim 10 in which the solid is a cross linked plastic.

References Cited in the file of this patent

UNITED STATES PATENTS

| | | |
|---|---|---|
| 2,762,871 | Dicke | Sept. 11, 1956 |
| 2,762,872 | Dicke | Sept. 11, 1956 |
| 2,802,944 | Norton | Aug. 13, 1957 |

OTHER REFERENCES

"Introduction to Solid State Physics," Kittel, 1953, pages 114–118 and 124–128.

Wittke: "Proceedings of the I.R.E.," March 1957, pages 291–316.

"Spectroscopy at Radio and Microwave Frequencies" (D.J.E. Ingram), published by Butterworth's Scientific Publications (London), 1955.